Patented Nov. 22, 1949

2,489,026

UNITED STATES PATENT OFFICE 2,489,026

ANTIFOGGING COMPOSITION

Richard L. Gilbert, Jr., Old Greenwich, Conn., assignor to American Cyanamid Company, New York, N. Y., a corporation of Maine No Drawing. Application July 2, 1946,
Serial No. 681,141

15 Claims. (Cl. 106—13)

This invention relates to anti-fogging agents for transparent surfaces such as glass or the transparent resins such as methyl methacrylate used in the windshields of automobiles, airplanes, etc. and in optical instruments. A principal object of the invention is the provision of an antifogging agent that is much more permanent than those that have previously been used, and which will therefore maintain its effectiveness for longer periods of time. The invention will be described with particular reference to military uses, but it should be understood that the advantages thereof are also important for other purposes and can be obtained whenever it is desired to maintain a transparent surface free from fog or condensed moisture under changing conditions or temperature or humidity.

An anti-fogging material is required at the present time to maintain the line of sight free from fog on transparent solid surfaces of airplanes. Thus, for example, during the flight of a dive bomber from an altitude of about 8,000 feet (temperature about 32° F.) to sea level, the sudden change in temperature and relative humidity of the air results in a condensation of moisture on the windshield and also on the lenses of the bombsight, and this seriously interferes with the effectiveness of the attack. The principal loci of fog are on the surfaces of the aviator's goggles and on the external and internal surfaces of the lenses in telescopes. An anti-fogging agent must not only function during the dive, but it must also continue to function in flight and after the optical equipment has been stored on the ground, and the hot, humid atmosphere of the South Pacific and other tropical combat areas causes this problem to be particularly severe.

A successful anti-fogging agent must be sufficiently hydrophilic to take up the water droplets that condense as fog and thus retain a clear, transparent film. For this reason, the anti-fogging agent must have surface-active properties and must therefore be at least slightly water-soluble. On the other hand, too high a degree of water-solubility results in a rapid removal of the effective anti-fogging agent from the transparent surface and it must be renewed at frequent intervals. Sodium di-(2-ethyl hexyl) sulfosuccinate is the anti-fogging agent that has been most widely used by the aviation forces of the United States, Canada and Great Britain, but I have found that certain other esters of sulfosuccinic acid are equally effective as anti-fogging agents and are much more permanent in character because they are less water-soluble.

In order to obtain optimum properties in this class of compounds it is necessary to maintain an extremely close balance between the wetting power, which determines the ability of the compound to prevent fog, and the water-insolubility of the compound, which determines its effective life. Too insoluble a compound does not possess sufficient surface-activity to distribute the water droplets as a clear, continuous film, whereas too soluble a compound is rapidly removed by the condenser moisture. The condensate is always colder than the surrounding atmosphere, and is almost always below 25° C., and therefore the solubilities referred to are those of the anti-fogging composition in cold water.

I have now discovered that the diesters of sulfosuccinic acid with alkyl-substituted hydroaromatic alcohols of 11–13 carbon atoms possess the requisite characteristics of surface-activity and insolubility in cold water to produce a satisfactory anti-fogging agent that is much more permanent in character than those previously used. The term "hydroaromatic alcohol" designates an alcohol containing a saturated 6-membered hydrocarbon ring, and the alcohol-forming hydroxy group may be attached to one of the ring carbon atoms, as in the cyclohexanols, or to a carbon atom in a side chain, as in the hexahydrobenzyl alcohols. Representative alcohols of this class containing 11–13 carbon atoms are 4-amyl and 4-hexyl cyclohexanol and 4-amyl and 4-isohexyl hexahydrobenzyl alcohol of the formula

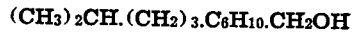

$(CH_3)_2CH.(CH_2)_3.C_6H_{10}.CH_2OH$

These esters are preferably used in the form of their sodium, potassium, ammonium or other water-soluble salts, it being understood that the term "water-soluble" designates only a limited degree of water-solubility in the compounds.

The above compounds are prepared by esterifying two mols of the alcohol with one mol of fumaric or maleic acid or maleic anhydride by standard esterification procedures, as by refluxing a slight excess of the alcohol with the acid in toluene solution in the presence of an esterification catalyst, followed by sulfonating the resulting diester with sodium bisulfite. Thus, for example, 400 grams of 4-tertiary-amylcyclohexanol was refluxed with 98 grams of maleic anhydride in the presence of 100 cc. of toluene and 3 grams of toluene sulfonic acid, using agitation and a water trap. After 3 hours at 158° C. the esterification was substantially complete. The reaction mixture was washed with dilute sodium hydroxide solution and then with water and the toluene and excess alcohol were removed by distillation at reduced pressure. 355 grams of the ester was sulfonated by refluxing with 96 grams (7% excess) of sodium bisulfite in 350 cc. of ethyl alcohol and 100 cc. of water for 10 hours. After filtering the sulfonated product and evaporating to dryness there was obtained 448 grams of sodium di-(4-amylcyclohexyl) sulfosuccinate in the form of a brittle white solid which ground easily to a white powder and formed a clear solution in hot water.

The sodium di-(4-amylhexahydrobenzyl) sulfosuccinate and sodium di-(4-isohexylhexahydrobenzyl) sulfosuccinate were prepared by the same procedure. Thus, the latter compound was made by heating 110 grams (0.5 mols+10% excess) of crude 4-isohexylhexahydrobenzyl alcohol with 25 grams of maleic anhydride, 50 cc. of toluene and 1 gram of p-toluene sulfonic acid for about 8 hours followed by washing with alkali solution and water and extracting the product with hot ethanol to separate the diester from impurities present in the crude alcohol used. 60 grams of the ester were sulfonated by agitation with 60 cc. of ethanol and 15 cc. of water containing 14 grams of sodium bisulfite for 10 hours.

From the foregoing it will be seen that my invention in its broader aspects consists in the provision of anti-fogging compositions containing as a principal essential ingredient a diester of sulfosuccinic acid with an alkyl-substituted hydroaromatic alcohol of 11–13 carbon atoms, preferably in the form of a water-soluble salt thereof and in the application of these compositions to transparent material such as glass, methyl methacrylate and the like. These esters may be used as such, or in conjunction with solvents, adhesives, other wetting agents, and the like.

As has been stated, the sulfosuccinate esters of the present invention are sufficiently hydrophilic to function as highly effective anti-fogging agents, yet the presence therein of two alkyl-substituted hydroaromatic radicals of 11–13 carbon atoms reduces their solubility in cold water to such an extent that they are not rapidly removed by the condensed moisture, and therefore possess a long effective life. I have found however, as another important feature of my invention, that the permanency of these compounds is still further enhanced by applying them to the surface to be protected in admixture with smaller quantities of gums and starches such as gum tragacanth, Irish moss, agar-agar, water-soluble or alkali-solubilized starches such as cornstarch and potato starch and alkali-solubilized casein such as sodium or ammonium caseinate. Thus, for example, a 1–4% aqueous solution of the sodium salt of a diester of sulfosuccinic acid with an alkyl-substituted hydroaromatic alcohol of 11–13 carbon atoms may be dispersed in a 1% aqueous solution of casein containing a preservative such as sodium pentachlorphenate and sufficient ammonia to dissolve the casein, or in 1% aqueous solution of gum tragacanth which may also contain a small amount of glycerin. Films formed by swabbing these dispersions on the inner transparent surfaces of an airplane cockpit have given excellent results on test dives.

The compositions of the present invention may be applied to the glass, methyl methacrylate or other transparent surfaces by any suitable method. They may be applied as such or as solutions in ethyl alcohol, carbon tetrachloride, solvent naphtha or other organic solvents. One convenient method is to impregnate cloth, paper, felt, sponge or other absorbent material with the esters, as by soaking in a strong alcohol solution and drying, after which the absorbent material may be rubbed over the glass to apply a thin film of the wetting agent thereto.

The permanency of the compounds of the invention is shown by the following test: a small amount of solution of the material to be tested, either in water or in an organic solvent, is swabbed onto a clean glass slide and allowed to dry. When necessary the film is then polished until it is completely transparent. The slide is chilled to about 0° C. and then dropped into a moist atmosphere of 35° C. above hot water contained in a flask. A Bureau of Standards 25X test chart is viewed through the slide while the latter is maintained in the warm, saturated atmosphere and the number of lines per inch legible after 10 seconds is recorded. In general, the maximum number of lines (56 per inch) can be read through an efficient anti-fog material.

In order to determine the permanency of the material under test the coated slide is dipped into distilled water, allowed to drain and dry and again tested. Sodium dioctyl sulfosuccinate, when tested by this method, permitted complete visibility before dipping, but the slide became fogged within 5 seconds upon a second test when it had first been dipped in water and dried. The sodium salt of the diester of sulfosuccinic acid with 4-isohexyl hexahydrobenzyl alcohol, when used alone, retained its original anti-fogging properties after having been dipped in water once, and the maximum number of lines on the chart were visible for 5 seconds after the slide was dipped in water and tested for two additional times. The sodium di-(4-amyl cyclohexyl) sulfosuccinate retained its original anti-fogging properties after having been dipped in water and tested for 3 successive times, and was therefore even better than the corresponding 4-isohexyl hexahydrobenzyl alcohol ester.

Aqueous solutions containing 2% of the same wetting agents together with 1% of gum tragacanth or casein gave even more permanent films. Those containing sodium di-(4-amyl cyclohexyl) sulfosuccinate retained their anti-fogging properties after as many as five test cycles, while those with sodium di-(4-isohexyl hexahydrobenzyl) sulfosuccinate withstood three test cycles but failed on the fourth.

This is a continuation-in-part of my copending application Serial No. 489,496, filed June 3, 1943, which has since been abandoned.

What I claim is:

1. An anti-fogging composition consisting essentially of a diester of sulfosuccinic acid with an alkyl-substituted hydroaromatic alcohol of 11–13 carbon atoms together with a smaller quantity of a hydrophilic colloid selected from the group consisting of water-soluble gums and starches and alkali-solubilized casein.

2. An anti-fogging composition consisting essentially of a water-soluble salt of a diester of sulfosuccinic acid with an alkyl-substituted hydroaromatic alcohol of 11–13 carbon atoms together with a smaller quantity of a member of the group consisting of water-soluble gums and starches and alkali-solubilized casein.

3. An anti-fogging composition consisting essentially of a diester of sulfosuccinic acid with an alkyl-substituted hydroaromatic alcohol of 11–13 carbon atoms together with a smaller quantity of an alkali-solubilized casein.

4. An anti-fogging composition consisting essentially of a diester of sulfosuccinic acid with an alkyl-substituted hydroaromatic alcohol of 11-13 carbon atoms together with a smaller quantity of gum tragacanth.

5. An anti-fogging composition consisting essentially of a water-soluble salt of a diester of sulfosuccinic acid with an alkyl-substituted hydroaromatic alcohol of 11-13 carbon atoms together with a smaller quantity of gum tragacanth.

6. An anti-fogging composition consisting essentially of a water-soluble salt of a diester of sulfosuccinic acid with an alkyl-substituted hydroaromatic alcohol of 11-13 carbon atoms together with a smaller quantity of an alkali-solubilized casein.

7. A method of inhibiting the formation of fog on transparent material which comprises applying thereto a thin film containing a diester of sulfosuccinic acid with an alkyl-substituted hydroaromatic alcohol of 11-13 carbon atoms.

8. A method of inhibiting the formation of fog on transparent material which comprises applying thereto a thin film containing a diester of sulfosuccinic acid with an alkyl-substituted hydroaromatic alcohol of 11-13 carbon atoms and also containing a smaller quantity of a hydrophilic colloid selected from the group consisting of water-soluble gums and starches and alkali-solubilized casein.

9. A transparent material having applied to a surface thereof a fog-inhibiting coating comprising, as the principal effective anti-fogging agent therein, a diester of sulfosuccinic acid with an alkyl-substituted hydroaromatic alcohol of 11-13 carbon atoms.

10. A diester of sulfosuccinic acid with an alkyl-substituted hydroaromatic alcohol of 11-13 carbon atoms.

11. As an anti-fogging compound, a water-soluble salt of a diester of sulfosuccinic acid with an alkyl-substituted hydroaromatic alcohol of 11-13 carbon atoms.

12. As an anti-fogging compound, a di-(4-amyl cyclohexyl) sulfosuccinate.

13. As an anti-fogging compound, a di-(4-isohexyl hexahydrobenzyl) sulfosuccinate.

14. As an anti-fogging compound, a water-soluble salt of di-(4-amyl cyclohexyl) sulfosuccinate.

15. As an anti-fogging compound, a water-soluble salt of di-(4-isohexyl hexahydrobenzyl) sulfosuccinate.

RICHARD L. GILBERT, Jr.

REFERENCES CITED

The following references are of record in the file of this patent:

UNITED STATES PATENTS

| Number | Name | Date |
|---|---|---|
| 1,369,708 | Roberts | Feb. 22, 1921 |
| 2,292,097 | Vollmer | Aug. 4, 1942 |
| 2,365,297 | Schweizer | Dec. 19, 1944 |
| 2,372,171 | Bennett | Mar. 27, 1945 |
| 2,414,015 | Carnes | Jan. 7, 1947 |
| 2,416,254 | Gilbert | Feb. 18, 1947 |

FOREIGN PATENTS

| Number | Country | Date |
|---|---|---|
| 835,187 | France | Sept. 19, 1938 |
| 856,046 | France | Mar. 4, 1940 |